(12) United States Patent
Hyoudou et al.

(10) Patent No.: US 8,835,520 B2
(45) Date of Patent: Sep. 16, 2014

(54) RUBBER-BASED RESIN CLOSED-CELL FOAM SHEET AND PROCESS FOR PRODUCING THE SAME

(75) Inventors: Shunji Hyoudou, Shimamoto-cho (JP); Kouichi Adachi, Hasuda (JP); Takao Suzuki, Hasuda (JP); Kentarou Nezu, Hasuda (JP)

(73) Assignee: Sekisui Chemical Co., Ltd., Osaka (JP)

( * ) Notice: Subject to any disclaimer, the term of this patent is extended or adjusted under 35 U.S.C. 154(b) by 309 days.

(21) Appl. No.: 13/498,668

(22) PCT Filed: Sep. 30, 2009

(86) PCT No.: PCT/JP2009/067112
§ 371 (c)(1),
(2), (4) Date: Mar. 30, 2012

(87) PCT Pub. No.: WO2011/039877
PCT Pub. Date: Apr. 7, 2011

(65) Prior Publication Data
US 2012/0232179 A1    Sep. 13, 2012

(51) Int. Cl.
*C08J 9/228* (2006.01)
*C08J 9/02* (2006.01)
*C08J 9/10* (2006.01)

(52) U.S. Cl.
CPC .............. *C08J 9/02* (2013.01); *C08J 2205/052* (2013.01); *C08J 2309/02* (2013.01); *C08J 2201/026* (2013.01); *C08J 9/10* (2013.01)
USPC ............................. 521/79; 521/142; 521/150

(58) Field of Classification Search
CPC .. C08J 9/10; C08J 2201/026; C08J 2205/052; C08J 2309/02; C08L 9/02
USPC .......................................... 521/79, 142, 150
See application file for complete search history.

(56) References Cited

U.S. PATENT DOCUMENTS

| 2,763,897 A * | 9/1956 | Osterhof et al. ................ 264/55 |
| 2009/0169860 A1 | 7/2009 | Katsunori et al. |

FOREIGN PATENT DOCUMENTS

| EP | 1 591 481 | 11/2005 |
| EP | 2 159 254 | 3/2010 |
| GB | 2041948 | 9/1980 |
| JP | 55-102634 | 8/1980 |
| JP | 9-111899 | 4/1997 |
| JP | 2000-302905 | 10/2000 |
| JP | 2006-265429 | 10/2006 |
| JP | 2009-190195 | 8/2009 |
| JP | 2009-242615 | 10/2009 |
| WO | 2006/003973 | 1/2006 |
| WO | 2007/072885 | 6/2007 |
| WO | 2007-072885 | 6/2007 |
| WO | 2008/153083 | 12/2008 |

OTHER PUBLICATIONS

Gosei Rubber Ichiranhyo, Nippon Zeon Co. Ltd., (Synthetic Rubber List), 2008 (with partial English translation of pp. 5-6).

* cited by examiner

*Primary Examiner* — Irina S Zemel
(74) *Attorney, Agent, or Firm* — Wenderoth, Lind & Ponack, L.L.P.

(57) ABSTRACT

The present invention provides a rubber-based resin closed-cell foam sheet with its sealing capability being unlikely to be lowered even for a prolonged period of use, and with its excellent waterproofing capability. The inventive rubber-based resin closed-cell foam sheet is characterized in that the foam sheet includes a rubber-based resin containing a nitrile group, and exhibits an excellent adhesion. When used as a waterproof sealing material, the foam sheet can adhere, in a tightly close contact, to the interface of a portion to be sealed. Therefore, the inventive rubber-based resin closed-cell foam sheet can be advantageously used as a waterproof sealing material having high sealing capability and excellent waterproofing capability.

5 Claims, No Drawings

RUBBER-BASED RESIN CLOSED-CELL FOAM SHEET AND PROCESS FOR PRODUCING THE SAME

This application is a U.S. national stage of International Application No. PCT/JP2009/067112 filed Sep. 30, 2009.

TECHNICAL FIELD

The present invention relates to rubber-based resin closed-cell foam sheets to be used as waterproof sealing materials and to a process for producing the same.

BACKGROUND ART

Nowadays, foam is widely used as a waterproof sealing material in various fields such as civil engineering, construction, electrical engineering, electronics engineering and vehicles. Examples of foam to be used as a waterproof sealing material include thermoplastic resin foam made of polyethylene-based resin and polypropylene-based resin or the like, and rubber foam made of synthetic rubber or natural rubber.

Among these sealing materials, the waterproof sealing materials are used for filling up interspace existing in various structures such as architectural structures, electrical equipment and vehicles in order to prevent water from entering those structures. Such waterproof sealing materials are arranged in a portion to be sealed in a compressed state to generate a repulsive force which restores the waterproof sealing materials to original shape. Then, the repulsive force causes the waterproof sealing materials to adhere tightly to the interface of the portion to be sealed without any interspace.

Here arises a problem that when the compression flexibility of the waterproof sealing material is low, the repulsive stress of the waterproof sealing material becomes so high as to deform the portion to be sealed. In addition, there is another problem that the deformation of the portion to be sealed may cause enlargement of the interspace of the structure and decrease of an adhesion property of the waterproof sealing material to the portion to be sealed (hereinafter to be referred to as "sealing capability"). The decreased adhesion property of the waterproof sealing material results in its poorer waterproofing capability.

In view of these problems, open-cell foam superior in compression flexibility has been used as the above-mentioned waterproof sealing material. Such open-cell foam, however, suffers from a problem that the cells are communicated with each other to thus easily permit the passage of water into the foam, resulting in poorer waterproofing capability. Also when an open-cell foam absorbs water and swells in contact with water to improve sealing capability, such open-cell foam is inferior in sealing capability until a sufficient water absorption, and may thus permit the passage of water before reaching the full sealing capability.

Also used as the above waterproof sealing material is another type of foam product having both closed cells and open cells, the former contributing to improved waterproofing capability and the latter contributing to improved compression flexibility. For example, Patent Document 1 discloses a fixed-form sealing material in which a foamed structure having both closed cells and open cells is provided with a cell skin having a water-absorptive, swelling property, and the number of cells per cm in length is eight or more.

In the above fixed-form sealing material, however, there arises a problem that its repulsive force decreases during a long-term use, causing its sealing capability to be lowered down to an insufficient level of waterproofing capability.

Therefore, Patent Document 2 discloses a rubber-based resin closed-cell foam sheet made of a foam structure having closed cells with a superior interfacial contact with a portion to be sealed, and also a highly functional waterproof sealing material using such closed-cell foam sheet. Nevertheless, even higher waterproofing capability has been desired.

DOCUMENTS FOR RELATED ART

Patent Document

Patent Document 1: JP-A-H09-111899
Patent Document 2: WO2007-072885

Problems to be Solved by the Invention

It is an object of the present invention to provide a rubber-based resin closed-cell foam sheet with its sealing capability being unlikely to be lowered even for a prolonged period of use, exhibiting excellent waterproofing capability, and also a process for producing the same.

Means for Solving the Problems

The rubber-based resin closed-cell foam sheet in accordance with the present invention is characterized in that the foam sheet includes a rubber-based resin containing 30% or more by weight of acrylonitrile ingredient.

A rubber-based resin is required to have not a liquid state but a rubber elasticity at 20° Celsius and one atmospheric pressure ($1.01 \times 10^{-1}$ MPa), and particularly used is a rubber-based resin containing an acrylonitrile ingredient. An acrylonitrile rubber is preferred as such a rubber-based resin. The rubber-based resin may be alone or in combination of two or more kinds.

Examples of the above-mentioned acrylonitrile rubber include, but are not particularly limited to, acrylonitrile rubber such as acrylonitrile butadiene rubber (NBR), hydrogenated acrylonitrile butadiene rubber (HNBR), carboxylated acrylonitrile butadiene rubber (XNBR), acrylonitrile butadiene isoprene rubber (NBIR), acrylonitrile isoprene rubber (NIR), and a terpolymer of acrylonitrile, butadiene, and a functional monomer having an anti-aging function or the like. Preferred among these are acrylonitrile butadiene rubber (NBR), from which is obtained a rubber-based resin closed-cell foam sheet being excellent in sealing capability, compression flexibility, durability, and resistance to oils.

The content of the acrylonitrile ingredient in the acrylonitrile rubber is limited to 30% or more by weight, preferably 35% or more by weight, and more preferably 35 to 50% by weight, because if the content is lower, the sealing capability is likely to be lowered when the rubber-based resin closed-cell foam sheet is used as a waterproof sealing material.

Further, synthetic rubber in a liquid state (hereinafter referred to as "liquid rubber") at 20° Celsius and one atmospheric pressure ($1.01 \times 10^{-1}$ MPa) may be contained in the above-mentioned rubber-based resin. This is because when liquid rubber is contained in the above-mentioned expandable resin composition, a load for kneading a below-mentioned expandable resin composition can be reduced.

The above-mentioned liquid rubber refers to synthetic rubber having a fluidity at 20° Celsius and one atmospheric pressure ($1.01 \times 10^{-1}$ MPa). Examples of the liquid rubber include, for example, a liquid acrylonitrile rubber such as liquid acrylonitrile butadiene rubber (liquid NBR), liquid and hydrogenated acrylonitrile butadiene rubber (liquid HNBR), liquid and carboxylated acrylonitrile butadiene rubber (liquid XNBR), liquid acrylonitrile butadiene isoprene rubber (liquid NBIR), liquid acrylonitrile isoprene rubber (liquid NIR), and a liquid terpolymer of acrylonitrile, butadiene, a functional monomer having an anti-aging function or the like; and liquid isoprene rubber (liquid IR). Such liquid rubber may be used alone or in combination of two or more kinds. In view of the fact that a rubber-based resin closed-cell foam sheet is obtained which is excellent in sealing capability, compression flexibility, durability, and resistance to oils, the liquid rubber is preferred to be liquid acrylonitrile rubber, and more preferred to be liquid acrylonitrile butadiene rubber (liquid NBR). It should be noted that the content of acrylonitrile ingredient in the liquid acrylonitrile butadiene rubber (liquid NBR) is not particularly limited.

Further, the content of the liquid rubber in the rubber-based resin closed-cell foam sheet is preferably 0.5 to 50 parts by weight, more preferably 1 to 30 parts by weight, and particularly preferably 1 to 10 parts by weight, and most preferably 1 to 5 parts by weight per 100 parts by weight of rubber-based resin. If the content of the liquid rubber is low in the rubber-based resin closed-cell foam sheet, a kneading load may become too high. If the content of the liquid rubber is low in the rubber-based resin closed-cell foam sheet, when the rubber-based resin closed-cell foam sheet is used as a waterproof sealing material, alignment of the waterproof sealing material may become difficult at the time of assembly, because the waterproof sealing material will have a lower initial tackiness and lacks an adhesion property of the waterproof sealing material to the portion to be sealed within shorter time. If the content of the liquid rubber is too high in the rubber-based resin closed-cell foam sheet, the liquid rubber is likely to bleed out on the water-stopping surface, which will cause the waterproofing capability to be lowered over an extended period of use.

In the rubber-based resin closed-cell foam sheet in accordance with the present invention, its all cells are not required to be closed cells, and open cells may be partially contained in the cells. Specifically, a closed cell ratio of the rubber-based resin closed-cell foam sheet is preferably 80 to 100%, and more preferably 85 to 100%, because when the ratio is low, the cells are liable to be communicated with each other in the rubber-based resin closed-cell foam sheet, permitting the passage of the water, which may lower the waterproofing capability of the rubber-based resin closed-cell foam sheet.

In a method of measuring a closed cell ratio in the above-mentioned rubber-based resin closed-cell foam sheet, a test piece of planar square shape with a respective side of 5 cm and with a given thickness is first cut out of the rubber-based resin closed-cell foam sheet. Next, a weight $W_1$ of such test piece is measured, and then an apparent volume $V_1$ of the test piece is calculated after measuring the thickness of the test piece.

Next, a value obtained in the above-mentioned manner is substituted into the below-mentioned equation (1) to figure out an apparent volume $V_2$ occupied by the cells. It should be noted that the density of resin constituting the test piece is $\rho$ g/cm$^3$.

$$\text{Apparent Volume } V_2 \text{ Occupied by Cells} = V_1 - W_1/\rho \quad (1)$$

Subsequently, the above test piece is sunk into distilled water at 23° Celsius so that the distance from the top surface of the test piece to the water surface is 100 mm, and pressure of 15 kPa is applied to the test piece for three minutes. After that, the test piece is removed from the distilled water; the water having been attached to the surface of the test piece is removed; and the weight $W_2$ of the test piece is measured to calculate a open cell ratio $F_1$ based on the below-mentioned equation (2), to determine the closed cell ratio $F_2$ from such open cell ratio $F_1$.

$$\text{Open Cell Ratio } F_1 \text{ (\%)} = 100 \times (W_2 - W_1)/V_2 \quad (2)$$

$$\text{Closed Cell Ratio } F_2 \text{ (\%)} = 100 - F_1 \quad (3)$$

Furthermore, peel strength of the rubber-based resin closed-cell foam sheet immediately after being produced (hereinafter referred to as "initial peel strength") is preferably 20 kPa or more, and more preferably 20 to 100 kPa. If the initial peel strength is too low, the sealing capability of the rubber-based resin closed-cell foam sheet is liable to be insufficient, and If the initial peel strength is too high, it may become difficult to peel the rubber-based resin closed-cell foam sheet when the foam sheet needs to be reapplied after having been improperly applied onto a substrate.

In a method to measure initial peel strength of the above-mentioned rubber-based resin closed-cell foam sheet, a rubber-based resin closed-cell foam sheet with the dimensions of 25 mm width×12.5 mm length×3.0 mm thickness is prepared immediately after having been produced, and an acrylic resin plate (25 mm width×100 mm length) is overlapped on both surfaces of the rubber-based resin closed-cell foam sheet to thus obtain a laminate. Such laminate is placed on a horizontal plane, and a weight of 500 g is placed on the center portion of the top surface of the laminate to apply pressure for 15 minutes in a direction of the thickness of the laminate. Thus, a test piece is produced in which the acrylic resin plate is integrally laminated respectively on both surfaces of the rubber-based resin closed-cell foam sheet. The test piece immediately after having been produced is measured for peel strength (kPa) when the rubber-based resin closed-cell foam sheet is peeled from the acrylic resin plate at a tensile speed of 50 mm per minute, in accordance with JIS K6850.

Furthermore, the rubber-based resin closed-cell foam sheet may include an additive. Examples of such additives include flame retardants, antioxidants, fillers, pigments, colorants, fungicides, foaming aids, and flame retardant aids.

Further, examples of the above-mentioned flame retardants include, but are not particularly limited to, metallic hydroxides such as aluminum hydroxide and magnesium hydroxide, bromine flame retardants such as decabromodiphenyl ether, and phosphorus flame retardants such as ammonium polyphosphate. These flame retardants may be used alone or in combination of two or more kinds. A flame retardant is commercially available from Albemarle under its product name "SAYTEX 8010".

Further, examples of the antioxidants include, but are not particularly limited to, phenolic antioxidants and sulfur antioxidants. Specifically, the phenolic antioxidant is commercially available from Ciba Specialty Chemicals Inc. under its product name "IRGANOX 1010". The antioxidants may be used alone or in combination of two or more kinds.

Further, examples of the fillers include, but are not particularly limited to, talc, calcium carbonate, bentonite, carbon black, fumed silica, aluminum silicate, acetylene black, and aluminum flake powder. The fillers may be used alone or in combination of two or more kinds.

Next, a process for producing a rubber-based resin closed-cell foam sheet shall be discussed. Examples of such process for producing rubber-based resin closed-cell foam sheets include a process for producing a rubber-based resin closed-cell foam sheet comprising; irradiating an expandable resin sheet comprising the rubber-based resin comprising 30% or more by weight of acrylonitrile ingredient and a foaming agent with an ionizing radiation to cross-link said expandable resin sheet, and then heating said expandable resin sheet to foam said sheet.

Further examples of processes for producing an expandable resin sheet include a method in which the above-mentioned expandable resin composition is kneaded by the use of a kneading machine such as a Banbury mixer and a pressure kneader, and is continuously formed into an expandable resin sheet by the use of an extruding machine, calendering machine, a conveyor belt casting machine, or the like.

Further, a method for cross-linking the expandable resin sheet is limited to a cross-linking treatment by means of an ionizing radiation. This is because the above-mentioned cross-linking treatment by means of an ionizing radiation enables a uniformly cross-linked expandable resin sheet to be obtained, and a rubber-based resin closed-cell foam sheet having uniform cells with small diameters can be obtained through expansion of such uniformly cross-linked expandable resin sheet. The rubber-based resin closed-cell foam sheet having such uniform cells with small diameters has its smooth surface enjoying a benefit of an improved close contact due to a larger area of contact onto a portion to be sealed, and such sheet is high in sealing capability and excellent in waterproofing capability.

Further, with regard to the cross-linking treatment, an exposure dose of the ionizing radiation to the expandable resin sheet can be optionally adjusted depending on properties of a rubber-based resin and applications of a rubber-based resin closed-cell foam sheet, but such dose is preferably 0.5 to 10 Mrad, and more preferably 0.7 to 5.0 Mrad.

Further, examples of the foaming agents to be contained in the expandable resin composition include, but not particularly limited to, azodicarbonamide, benzene sulfonyl hydrazide, dinitroso-pentamethylene tetramine, toluene-sulfonyl hydrazide, and 4,4-oxybis(benzenesulfonyl hydrazide), but azodicarbonamide is preferred. The foaming agents may be used alone or in combination of two or more kinds.

Further, the content of the foaming agent in the expandable resin composition is preferably 1 to 30 parts by weight per 100 parts by weight of rubber-based resin. This is because when the content is low, the expandable resin composition may not be expanded sufficiently, disabling a production of rubber-based resin closed-cell foam sheet with a shape as desired, and when the content is high, an intended rubber-based resin closed-cell foam sheet may not be produced due to an abnormal expansion, a broken cell, or the like.

Effect of the Invention

The rubber-based resin closed-cell foam sheet in accordance with the present invention is characterized in that the foam sheet includes the rubber-based resin containing 30% or more by weight of acrylonitrile ingredient and thus has an excellent adhesion without any interspace. When used as a waterproof sealing material, the foam sheet can be adhered, in tightly close contact, along the interface of the portion to be sealed. Therefore, the inventive rubber-based resin closed-cell foam sheet can be advantageously used as a waterproof sealing material having high sealing capability and excellent waterproofing capability.

Further, since the inventive rubber-based resin closed-cell foam sheet is so constructed and designed as mentioned above, the foam sheet has an excellent compression flexibility, and so when used as a waterproof sealing material, its repulsive stress is not likely to deform the portion to be sealed so that the waterproofing capability is least likely to be reduced.

DETAILED DESCRIPTION OF THE INVENTION

The aspects of the present invention shall be described below in greater detail with reference to the examples. It should be noted, however, that the present invention is not limited to these examples alone.

Inventive Example 1

An expandable resin composition was kneaded by the use of a pressure kneader. The expandable resin composition consisting of 100 parts by weight of acrylonitrile butadiene rubber (NBR) (a product name "Nipol 1041" available from Nippon Zeon Co., Ltd., solid with a density of 1.00 g/cm$^3$, 40.5% by weight of acrylonitrile ingredient), 15 parts by weight of azodicarbonamide (a product name "SO-L" available from Otsuka Chemical Co., Ltd., decomposition temperature of 197° Celsius), and 0.1 parts by weight of pulverulent phenolic antioxidant (a product name "IRGANOX 1010" available from Ciba Specialty Chemicals Inc. The acrylonitrile butadiene rubber was not of a liquid phase but had a rubber elasticity at 20° Celsius and one atmospheric pressure ($1.01 \times 10^{-1}$ MPa).

Next, the expandable resin composition was supplied to and melt-kneaded by an extruder, through which the expandable resin composition in a molten state was extruded at an extrusion speed of 50 kg per hour to be formed into an expandable resin sheet.

Subsequently, the expandable resin sheet was irradiated, on both surfaces, with an ionizing radiation of 1.2 Mrad at an acceleration voltage of 500 keV so as to be cross-linked.

Then, the expandable resin sheet was supplied into a foam oven and heated at 240° Celsius to be expanded, and thus a rubber-based resin closed-cell foam sheet with an apparent density of 35 kg/m$^3$, a closed-cell ratio of 93%, and a thickness of 3.0 mm was obtained.

Inventive Example 2

A rubber-based resin closed-cell foam sheet with an apparent density of 36 kg/m$^3$, closed-cell ratio of 91%, and a thickness of 3.0 mm was obtained in the same manner as in Inventive Example 1 except for the use of the expandable resin composition consisting of 100 parts by weight of acrylonitrile butadiene rubber (NBR) (a product name "Nipol 1042" available from Nippon Zeon Co., Ltd., solid with a density of 0.98 g/cm$^3$, 33.5% by weight of acrylonitrile ingredient), 15 parts by weight of azodicarbonamide (a product name "SO-L" available from Otsuka Chemical Co., Ltd., decomposition temperature of 197° Celsius), and 0.1 parts by weight of pulverulent phenolic antioxidant (a product name "IRGANOX 1010" available from Ciba Specialty Chemicals Inc. The acrylonitrile butadiene rubber was not of a liquid phase but had a rubber elasticity at 20° Celsius and one atmospheric pressure ($1.01 \times 10^{-1}$ MPa).

Inventive Example 3

A rubber-based resin closed-cell foam sheet with an apparent density of 36 kg/m$^3$, closed-cell ratio of 90%, and a thickness of 3.0 mm was obtained in the same manner as in Inventive Example 1 except for the use of the expandable resin composition consisting of 100 parts by weight of acrylonitrile butadiene rubber (NBR) (a product name "Nipol 1042" available from Nippon Zeon Co., Ltd., solid with a density of 0.98 g/cm³, 33.5% by weight of acrylonitrile ingredient), 3 parts by weight of liquid acrylonitrile butadiene rubber (liquid NBR) (a product name "Nipol 1312" available from Nippon Zeon Co., Ltd., with a density of 0.98 g/cm³), 15 parts by weight of azodicarbonamide (a product name "SO-L" available from Otsuka Chemical Co., Ltd., decomposition temperature of 197° Celsius), and 0.1 parts by weight of pulverulent phenolic antioxidant (a product name "IRGANOX 1010" available from Ciba Specialty Chemicals Inc. The acrylonitrile butadiene rubber was not of a liquid phase but had a rubber elasticity at 20° Celsius and one atmospheric pressure ($1.01 \times 10^{-1}$ MPa). The liquid acrylonitrile butadiene rubber had a fluidity at 20° Celsius and one atmospheric pressure ($1.01 \times 10^{-1}$ MPa).

Comparative Example 1

A rubber-based resin closed-cell foam sheet with an apparent density of 35 kg/m³, closed-cell ratio of 90%, and a thickness of 3.0 mm was obtained in the same manner as in Inventive Example 1 except for the use of the expandable resin composition consisting of 100 parts by weight of acrylonitrile butadiene rubber (NBR) (a product name "Nipol DN401LL" available from Nippon Zeon Co., Ltd., solid with a density of 0.94 g/cm³, 18.0% by weight of acrylonitrile ingredient), 15 parts by weight of azodicarbonamide (a product name "SO-L" available from Otsuka Chemical Co., Ltd., decomposition temperature of 197° Celsius), and 0.1 parts by weight of pulverulent phenolic antioxidant (a product name "IRGANOX 1010" available from Ciba Specialty Chemicals Inc. The acrylonitrile butadiene rubber was not of a liquid phase but had a rubber elasticity at 20° Celsius and one atmospheric pressure ($1.01 \times 10^{-1}$ MPa).

Comparative Example 2

A rubber-based resin closed-cell foam sheet with an apparent density of 34 kg/m³ and a thickness of 3.0 mm was obtained in the same manner as in Inventive Example 1 except for the use of the expandable resin composition consisting of 100 parts by weight of ethylene-propylene copolymer rubber (EPDM) (a density of 0.87 g/m³), 15 parts by weight of azodicarbonamide (a product name "SO-L" available from Otsuka Chemical Co., Ltd., decomposition temperature of 197° Celsius), and 0.1 parts by weight of pulverulent phenolic antioxidant (a product name "IRGANOX 1010" available from Ciba Specialty Chemicals Inc.

Initial peel strength and waterproofing capability of the rubber-based resin closed-cell foam sheets as obtained above were measured in the following manner, results of which are shown in Table 1.

(Initial Peel Strength)
Each of the rubber-based resin closed-cell foam sheets immediately after its production was cut into 25 mm width × 12.5 mm length, and an acrylic resin plate of 25 mm width × 100 mm length was overlapped on both surfaces of the rubber-based resin closed-cell foam sheet to obtain a laminate. Such laminate was placed on a horizontal plane, and then a weight of 500 g was placed on the center portion of the top surface of the laminate to apply pressure for 15 minutes in a direction of the thickness of the laminate. Thus, a test piece was produced in which the acrylic resin plate is integrally laminated respectively on both surfaces of the rubber-based resin closed-cell foam sheet.

Then, the test piece immediately after its production was measured for peel strength (kPa) when the rubber-based resin closed-cell foam sheet was peeled from the acrylic resin plate at a tensile speed of 50 mm per minute, in accordance with JIS K6850.

(Waterproofing Capability)
First, each of the rubber-based resin closed-cell foam sheets as obtained above was cut out to produce a test piece with a circular ring shape having its outer diameter of 100 mm and its inner diameter of 80 mm (thickness: 3.0 mm). Next, such test piece was placed on the center portion of a tabular acrylic resin plate. Another tabular acrylic resin plate with a hole extending through its center portion was placed on the test piece in a manner of allowing the through-hole to be in alignment with the center of the circle of the test piece, to thus obtain a laminate. By compressing such laminate in a direction of thickness of the test piece, a test piece was obtained with a distance of 2.55 mm between the opposing surfaces of the two acrylic resin plates (compression ratio of the test piece: 15%).

Subsequently, distilled water was supplied through the through-hole of the above test piece into a space surrounded between the opposing surfaces of the two acrylic resin plates and the test piece, with the distilled water filling up the space. After that, pressure of 15 kPa was applied through the through-hole of the above test piece, and time involved from the start of pressure application until the start of distilled water leakage (waterproofing time (minute)) was measured. The waterproofing time exceeding 120 minutes was expressed as "No Leakage" in Table 1.

TABLE 1

|  |  | Inventive Example 1 | Inventive Example 2 | Inventive Example 3 | Comparative Example 1 | Comparative Example 2 |
|---|---|---|---|---|---|---|
| Rubber-based Resin | NBR (part by weight) | 100 | 100 | 100 | 100 | 0 |
|  | Acrylonitrile Ingredient (% by weight) | 40.5 | 33.5 | 33.5 | 18 | 0 |
|  | EPDM (part by weight) | 0 | 0 | 0 | 0 | 100 |
| Liquid Rubber |  | 0 | 0 | 3 | 0 | 0 |
| Initial Peel Strength (kPa) |  | 27 | 24 | 26 | 17 | <5 |
| Waterproofing Capability (minute) |  | No Leakage | No Leakage | No Leakage | 105 | 8 |

INDUSTRIAL APPLICABILITY

The rubber-based resin closed-cell foam sheet in accordance with the present invention can be used as a waterproof sealing material applicable in various fields such as civil engineering, construction, electrical engineering, electronics, and vehicles.

The invention claimed is:
1. A rubber-based resin closed-cell foam sheet comprising:
a rubber-based resin having a rubber elasticity at 20° Celsius and $1.01 \times 10^{-1}$ MPa and comprising 30% or more by weight of acrylonitrile ingredient, and synthetic rubber in a liquid state at 20° Celsius and $10 \times 10^{-1}$ MPa.

2. The rubber-based resin closed-cell foam sheet according to claim 1, wherein said rubber-based resin is acrylonitrile butadiene rubber.

3. A process for producing a rubber-based resin closed-cell foam sheet comprising:
   irradiating an expandable resin sheet comprising the rubber-based resin having rubber elasticity at 20° Celsius and $1.01 \times 10^{-1}$ MPa and comprising 30% or more by weight of acrylonitrile ingredient, synthetic rubber in a liquid state at 20° Celsius and $1.01 \times 10^{-1}$ MPa, and a foaming agent with an ionizing radiation to cross-link said expandable resin sheet and then
   heating said expandable resin sheet to foam said sheet.

4. The rubber-based resin closed-cell foam sheet according to claim 1, wherein said synthetic rubber in a liquid state is liquid acrylonitrile butadiene rubber.

5. The process for producing a rubber-based resin closed-cell foam sheet according to claim 3,
   wherein said synthetic rubber in a liquid state is liquid acrylonitrile butadiene rubber.

* * * * *